United States Patent
Ishida et al.

(10) Patent No.: US 10,960,727 B2
(45) Date of Patent: Mar. 30, 2021

(54) VEHICLE AIR CONDITIONER

(71) Applicant: HONDA MOTOR CO., LTD., Tokyo (JP)

(72) Inventors: Osamu Ishida, Wako (JP); Hiroshi Maeda, Wako (JP); Masaki Sekiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 16/288,129

(22) Filed: Feb. 28, 2019

(65) Prior Publication Data
US 2019/0283528 A1 Sep. 19, 2019

(30) Foreign Application Priority Data
Mar. 16, 2018 (JP) .............................. JP2018-049853

(51) Int. Cl.
*B60H 1/00* (2006.01)

(52) U.S. Cl.
CPC ..... *B60H 1/00507* (2013.01); *B60H 1/00485* (2013.01); *B60H 1/00664* (2013.01); *B60H 1/00807* (2013.01); *B60H 2001/006* (2013.01)

(58) Field of Classification Search
CPC ............ B60H 1/00507; B60H 1/00485; B60H 1/00807; B60H 1/00664; B60H 2001/006; B60H 2001/3258; B60H 2001/3277; B60H 1/3211; B60H 1/3205; Y02T 10/88; B60K 11/085

USPC .......................................................... 62/239
See application file for complete search history.

(56) References Cited

U.S. PATENT DOCUMENTS

2016/0159204 A1* 6/2016 Katoh ................ B60H 1/32284
62/185

FOREIGN PATENT DOCUMENTS

JP        2011-063085         3/2011

* cited by examiner

*Primary Examiner* — Steve S Tanenbaum
(74) *Attorney, Agent, or Firm* — Amin, Turocy & Watson, LLP

(57) ABSTRACT

A vehicle air conditioner includes: a refrigerant circuit which includes a compressor, an external heat exchanger, an expansion valve, and an evaporator; and a cooling fan. The vehicle air conditioner further includes: a refrigerant temperature detection part; a vehicle environment temperature detection part; and a controller. The refrigerant temperature detection part is configured to determine the temperature of a refrigerant which flows into the expansion valve. The vehicle environment temperature detection part is configured to determine a temperature outside the refrigerant circuit under an installation environment. The controller is configured to control a speed of the cooling fan in a cooling operation time such that a cooling performance with respect to the external heat exchanger is decreased when the temperature difference between a determined refrigerant temperature by the refrigerant temperature detection part and a determined external temperature by the vehicle environment temperature detection part is equal to or less than a first set temperature difference.

2 Claims, 7 Drawing Sheets

FIG. 5

| ΔTf RANGE | COOLING FAN OUTPUT CONTROL | SHUTTER CONTROL |
|---|---|---|
| ΔTf ≦ 3deg | MIN | CLOSE |
| 3deg < ΔTf ≦ 5deg | MAX × 0.3 | OPEN |
| 5deg < ΔTf ≦ 7deg | MAX × 0.5 | OPEN |
| 7deg < ΔTf ≦ 10deg | MAX × 0.7 | OPEN |
| 10deg < ΔTf | MAX | OPEN |

FIG. 7

| ΔPf RANGE | COOLING FAN OUTPUT CONTROL | SHUTTER CONTROL |
|---|---|---|
| $\Delta Pf \leq 0.3 Mpa$ | MIN | CLOSE |
| $0.3 Mpa < \Delta Pf \leq 0.5 Mpa$ | MAX × 0.3 | OPEN |
| $0.5 Mpa < \Delta Pf \leq 0.7 Mpa$ | MAX × 0.5 | OPEN |
| $0.7 Mpa < \Delta Pf \leq 1.0 Mpa$ | MAX × 0.7 | OPEN |
| $1.0 Mpa < \Delta Pf$ | MAX | OPEN |

VEHICLE AIR CONDITIONER

CROSS-REFERENCE TO RELATED APPLICATION

Priority is claimed on Japanese Patent Application No. 2018-049853, filed on Mar. 16, 2018, the contents of which are incorporated herein by reference.

BACKGROUND

Field of the Invention

The present invention relates to a vehicle air conditioner having a cooling function.

Background

In a vehicle air conditioner having a cooling function, an evaporator as an internal heat exchanger is provided on a refrigerant circuit having an inner part through which a refrigerant is circulated, and a heat exchange between in-room air and the refrigerant that passes through the inside of the evaporator is performed. The refrigerant circuit includes: a compressor that is configured to compress and discharge the refrigerant; an external heat exchanger that is configured to perform a heat exchange between external air and the refrigerant that is discharged from the compressor; an expansion valve that is configured to reduce the pressure of the refrigerant applied with the heat exchange at the external heat exchanger; and the evaporator described above that is configured to perform a heat exchange between the in-room air and the refrigerant which passes through the expansion valve and that is configured to allow the refrigerant to return to the compressor. A cooling fan that is configured to send air to the external heat exchanger is arranged in the vicinity of the external heat exchanger, and heat release of the external heat exchanger in a cooling operation time is prompted (for example, refer to Japanese Patent Application, Publication No. 2011-63085).

SUMMARY

However, in the vehicle air conditioner of the related art described above, when a temperature outside the refrigerant circuit is decreased in the cooling operation time due to a decrease of an external air temperature, an increase of a vehicle travel speed, and the like, the refrigerant at an exit part of the external heat exchanger may be overcooled in cooperation with the air sent by the cooling fan, and the flow rate of the refrigerant that is circulated in the refrigerant circuit may be decreased. When the flow rate of the refrigerant that is circulated in the refrigerant circuit is decreased in this way, a discharge pressure of the refrigerant at the compressor is decreased, and the pressure of the refrigerant inside the external heat exchanger is also decreased. When the pressure of the refrigerant inside the external heat exchanger is decreased, a wet saturated steam is mixed in a liquid refrigerant that flows to the expansion valve side from the exit part of the external heat exchanger, and the wet saturated steam may generate an abnormal sound that is unpleasant for a user when passing through the expansion valve.

An aspect of the present invention provides a vehicle air conditioner that is capable of preventing an abnormal sound when a refrigerant passes through an expansion valve from occurring in a cooling operation time.

A vehicle air conditioner according to an aspect of the present invention includes: a refrigerant circuit which includes a compressor that is configured to compress and discharge a refrigerant, an external heat exchanger that is configured to perform a heat exchange between external air and the refrigerant which is discharged from the compressor, an expansion valve that is configured to reduce a pressure of the refrigerant applied with the heat exchange at the external heat exchanger, and an evaporator that is configured to perform a heat exchange between the refrigerant which passes through the expansion valve and air for air conditioning and that is configured to allow the refrigerant which finishes the heat exchange to return to the compressor; and a cooling fan that is configured to send air to the external heat exchanger, wherein the refrigerant is circulated through the compressor, the external heat exchanger, the expansion valve, and the evaporator in this order in a cooling operation time, the vehicle air conditioner further including: a refrigerant temperature detection part that is configured to determine the temperature of the refrigerant which flows into the expansion valve; a vehicle environment temperature detection part that is configured to determine a temperature outside the refrigerant circuit under an installation environment; and a controller that is configured to control parts including the cooling fan, wherein the controller is configured to control a speed of the cooling fan in a cooling operation time such that a cooling performance with respect to the external heat exchanger is decreased when the temperature difference between a determined refrigerant temperature by the refrigerant temperature detection part and a determined external temperature by the vehicle environment temperature detection part is equal to or less than a first set temperature difference.

According to the above configuration, in a cooling operation time, when a vehicle environment temperature is decreased due to a decrease of an external air temperature, an increase of a vehicle travel speed, and the like, and the temperature difference between the determined refrigerant temperature and the determined external temperature becomes equal to or less than the first set temperature difference, the speed of the cooling fan is decreased by a control by the controller. Thereby, excessive cooling of the refrigerant at the external heat exchanger is prevented, and the decrease in the flow rate of the refrigerant that flows through the refrigerant circuit is prevented. As a result, the decrease in the pressure of the refrigerant that is compressed at the compressor and is sent to the external heat exchanger is prevented, and the refrigerant pressure inside the external heat exchanger is maintained to be high. Thereby, the refrigerant that is sent to the expansion valve from the exit part of the external heat exchanger becomes a state of a liquid refrigerant that includes little wet steam, and the occurrence of an abnormal sound when the refrigerant passes through the expansion valve is prevented.

The vehicle air conditioner described above may further include an open-close door that is configured to open and close a passage of a travel air which flows into the external heat exchanger, wherein the controller may control the open-close door in a cooling operation time such that the passage is opened when the temperature difference exceeds a second set temperature difference which is smaller than the first set temperature difference and such that the passage is closed when the temperature difference is equal to or less than the second set temperature difference.

In this case, when the temperature difference between the determined refrigerant temperature and the determined external temperature becomes equal to or less than the first set temperature difference in the cooling operation time, the speed of the cooling fan is decreased by the control by the controller. At this time, the passage of the travel air is opened by the open-close door when the temperature difference between the determined refrigerant temperature and the determined external temperature exceeds the second set temperature difference. When the temperature difference between the determined refrigerant temperature and the determined external temperature becomes equal to or less than the second set temperature difference, the passage is closed by the open-close door by the control of the controller. As a result, it becomes difficult for the travel air to flow into the vicinity of the refrigerant circuit in a vehicle travel time, and excessive cooling of the external heat exchanger by the travel air is prevented.

A vehicle air conditioner according to another aspect of the present invention includes: a refrigerant circuit which includes a compressor that is configured to compress and discharge a refrigerant, an external heat exchanger that is configured to perform a heat exchange between external air and the refrigerant which is discharged from the compressor, an expansion valve that is configured to reduce a pressure of the refrigerant applied with the heat exchange at the external heat exchanger, and an evaporator that is configured to perform a heat exchange between the refrigerant which passes through the expansion valve and air for air conditioning and that is configured to allow the refrigerant which finishes the heat exchange to return to the compressor; and a cooling fan that is configured to send air to the external heat exchanger, wherein the refrigerant is circulated through the compressor, the external heat exchanger, the expansion valve, and the evaporator in this order in a cooling operation time, the vehicle air conditioner further including: a refrigerant pressure detection part that is configured to determine a pressure of the refrigerant which flows into the expansion valve; a vehicle environment temperature detection part that is configured to determine a temperature outside the refrigerant circuit under an installation environment; and a controller that is configured to control parts including the cooling fan, wherein the controller is configured to control a speed of the cooling fan in a cooling operation time such that a cooling performance with respect to the external heat exchanger is decreased when a pressure difference between a determined refrigerant pressure by the refrigerant pressure detection part and a refrigerant saturation pressure corresponding to a determined external temperature by the vehicle environment temperature detection part is equal to or less than a first set pressure difference.

According to the above configuration, in a cooling operation time, when a vehicle environment temperature is decreased due to a decrease of an external air temperature, an increase of a vehicle travel speed, and the like, and the pressure difference between the determined refrigerant pressure and the refrigerant saturation pressure corresponding to the determined external temperature becomes equal to or less than the first set pressure difference, the speed of the cooling fan is decreased by a control by the controller. Thereby, excessive cooling of the refrigerant at the external heat exchanger is prevented, and the decrease in the flow rate of the refrigerant that flows through the refrigerant circuit is prevented. As a result, the decrease in the pressure of the refrigerant that is compressed at the compressor and is sent to the external heat exchanger is prevented, and the refrigerant pressure inside the external heat exchanger is maintained to be high. Thereby, the refrigerant that is sent to the expansion valve from the exit part of the external heat exchanger becomes a state of a liquid refrigerant that includes little wet steam, and the occurrence of an abnormal sound when the refrigerant passes through the expansion valve is prevented.

The vehicle air conditioner described above may further include an open-close door that is configured to open and close a passage of a travel air which flows into the external heat exchanger, wherein the controller may control the open-close door in a cooling operation time such that the passage is opened when the pressure difference exceeds a second set pressure difference which is smaller than the first set pressure difference and such that the passage is closed when the pressure difference is equal to or less than the second set pressure difference.

In this case, when the pressure difference between the determined refrigerant pressure and the refrigerant saturation pressure corresponding to the determined external temperature becomes equal to or less than the first set pressure difference in the cooling operation time, the speed of the cooling fan is decreased by the control by the controller. At this time, the passage of the travel air is opened by the open-close door when the pressure difference between the determined refrigerant pressure and the refrigerant saturation pressure corresponding to the determined external temperature exceeds the second set temperature difference. When the pressure difference between the determined refrigerant pressure and the refrigerant saturation pressure corresponding to the determined external temperature becomes equal to or less than the second set pressure difference, the passage is closed by the open-close door by the control of the controller. As a result, it becomes difficult for the travel air to flow into the vicinity of the refrigerant circuit in a vehicle travel time, and excessive cooling of the external heat exchanger by the travel air is prevented.

According to an aspect of the present invention, in the cooling operation time, when the refrigerant at the exit part of the external heat exchanger becomes an excessive cooling state due to a decrease of an external air temperature, an increase of a vehicle travel speed, and the like, the speed of the cooling fan is controlled such that the cooling performance with respect to the external heat exchanger is decreased, and therefore, it is possible to prevent a wet saturated steam from being mixed in a liquid refrigerant that flows to the expansion valve side from the external heat exchanger. Accordingly, when the aspect of the present invention is employed, it is possible to prevent an abnormal sound when the refrigerant passes through the expansion valve from occurring.

BRIEF DESCRIPTION OF THE DRAWINGS

FIG. 5 is a view showing a control state of a cooling fan and an open-close door corresponding to each of temperature differences $\Delta Tf$ according to the first embodiment of the present invention.

FIG. 7 is a view showing a control state of a cooling fan and an open-close door corresponding to each of pressure differences ΔPf according to the second embodiment of the present invention.

DESCRIPTION OF THE EMBODIMENTS

Hereinafter, embodiments of the present invention will be described with reference to the drawings.

First, a first embodiment is described with reference to FIG. 1 to FIG. 5.

Figure 1:
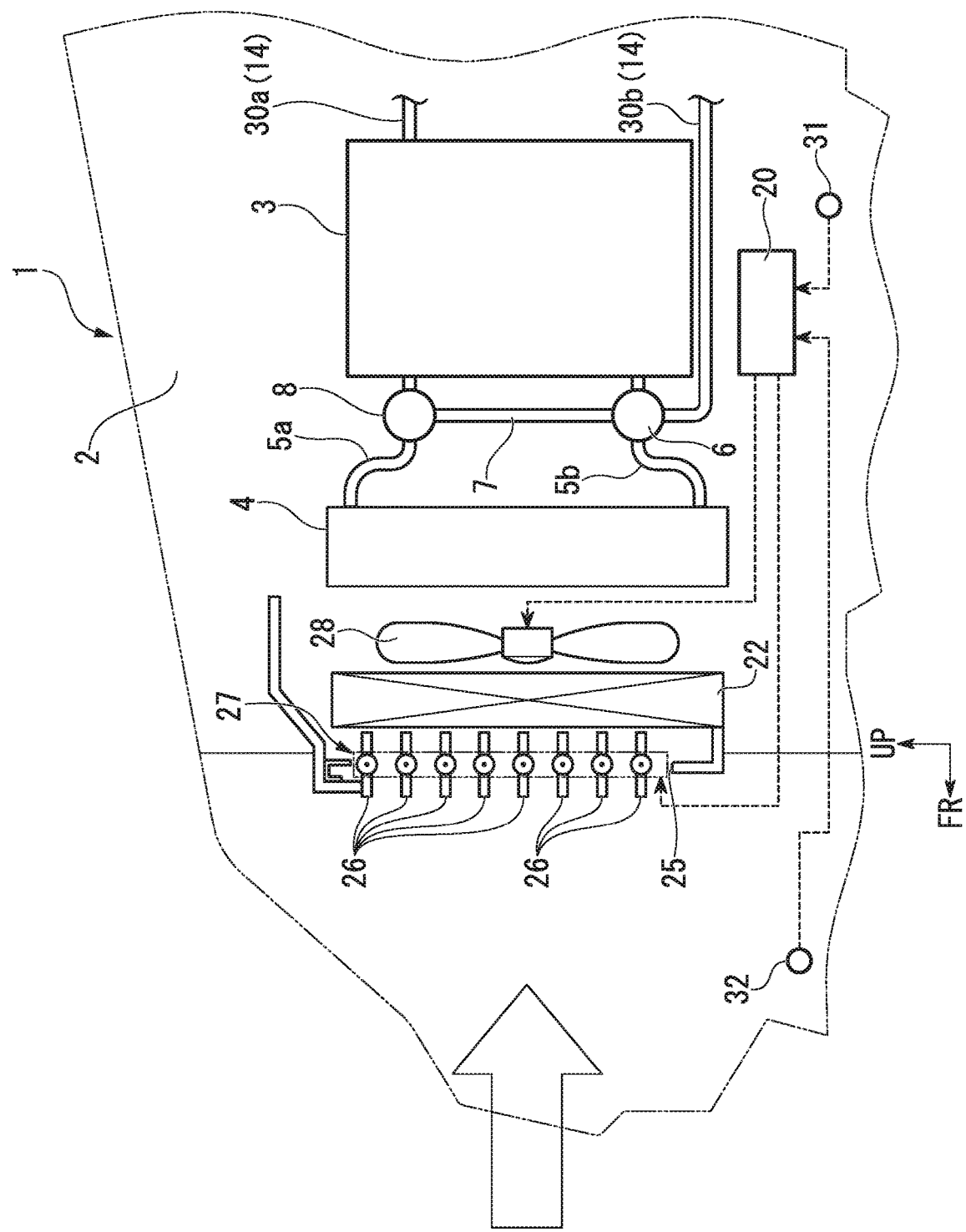
FIG. 1 is a schematic configuration view of a vehicle including a vehicle air conditioner according to a first embodiment of the present invention.
Figure 2:
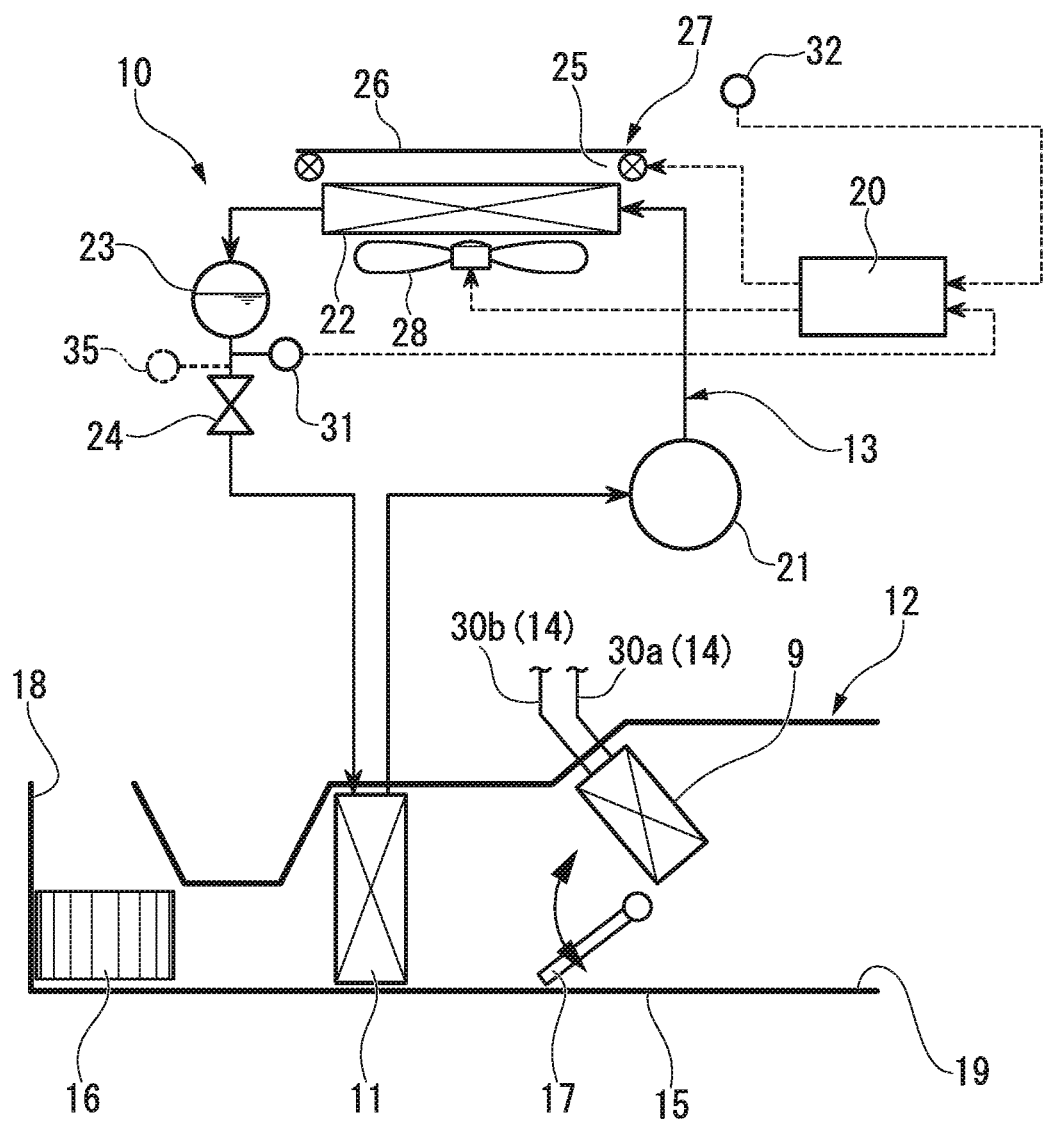
FIG. 2 is a schematic configuration view of the vehicle air conditioner according to the first embodiment of the present invention.

FIG. 1 is a view showing a schematic configuration of a front part of a vehicle 1 that includes a vehicle air conditioner 10 (hereinafter, referred to as an "air conditioner 10") of the first embodiment. In FIG. 1, an arrow FR that indicates a frontward direction of the vehicle 1 and an arrow UP that indicates an upward direction of the vehicle 1 are shown. FIG. 2 is a view showing a schematic configuration of the air conditioner 10 of the first embodiment.

As shown in FIG. 1, an engine 3 for driving the vehicle is mounted inside an engine room 2 at a front part of the vehicle 1. A radiator 4 for cooling a coolant that flows inside the engine 3 is arranged at a frontward position of the engine 3. The engine 3 and the radiator 4 are connected to each other by coolant pipes 5a, 5b. A water pump 6 for supplying the coolant is provided on one coolant pipe 5b. A bypass passage 7 in FIG. 1 connects a middle part of the one coolant pipe 5b and a middle part of the other coolant pipe 5a. A thermostat 8 opens and closes the bypass passage 7 in response to a coolant temperature.

The air conditioner 10 shown in FIG. 2 is mounted on the vehicle 1. The air conditioner 10 includes a heater core 9 as an internal heat exchanger for heating and an evaporator 11 as an internal heat exchanger for cooling. The heater core 9 is connected to the coolant pipes 5a, 5b (refer to FIG. 1) on the engine 3 side via branch pipes 30a, 30b. The air conditioner 10 of the first embodiment performs heating by using heat (heat of the coolant that passes through the engine 3) of the engine 3.

The air conditioner 10 includes an air conditioner unit 12, a refrigerant circuit 13 for cooling, and a heat circuit 14 for heating. The refrigerant circuit 13 is a circuit that includes the evaporator 11 described above. The heat circuit 14 is a circuit that includes the branch pipes 30a, 30b and the heater core 9 described above.

The air conditioner unit 12 includes a duct 15 in which air for air conditioning flows and a blower 16, the evaporator 11, an air mix door 17, and the heater core 9 that are accommodated inside the duct 15.

The duct 15 includes an air intake port 18 that is arranged at an upstream position in a flow direction of the air for air conditioning and an air blow port 19 that is arranged at a downstream position. The blower 16, the evaporator 11, the air mix door 17, and the heater core 9 are arranged in this order from the upstream side toward the downstream side in the flow direction of the air for air conditioning.

The blower 16 is driven, for example, in response to a drive voltage that is applied by a control by a controller 20 and sends air for air conditioning (at least one of internal air and external air) that is introduced into the duct 15 via the air intake port 18 toward the downstream side.

The evaporator 11 performs a heat exchange between a low-pressure refrigerant that flows into the inside of the evaporator 11 and air for air conditioning (air that flows inside the duct 15) that passes in the vicinity of the evaporator 11 and cools the air for air conditioning that passes in the vicinity of the evaporator 11 by latent heat when the refrigerant evaporates.

The heater core 9 heats air for air conditioning that passes in the vicinity of the heater core 9 by a high-temperature coolant that passes through the engine 3.

The air mix door 17 is rotatable by a drive means (not shown) that is driven by a control by the controller 20. Specifically, the air mix door 17 is rotated in the duct 15 between a heating position at which an air passing route (heating route) toward the heater core 9 is opened and a cooling position at which an air passing route that bypasses the heating route is opened.

The refrigerant circuit 13 includes a compressor 21, an external heat exchanger 22, a liquid reception container 23, an expansion valve 24, and the evaporator 11. The compressor 21, the external heat exchanger 22, the liquid reception container 23, the expansion valve 24, and the evaporator 11 are connected together by a pipe.

The compressor 21 is driven by electric power or an engine power, compresses a low-pressure gas refrigerant, and discharges the refrigerant.

The external heat exchanger 22 performs a heat exchange between external air and a high-temperature and high-pressure gas refrigerant that is discharged from the compressor 21. As shown in FIG. 1, the external heat exchanger 22 is arranged on a vehicle frontward side of the engine 3 and the radiator 4. An air passing port 25 (passage) for introducing travel air in the external heat exchanger 22 direction in a vehicle travel time is provided at a frontward position of the external heat exchanger 22. A shutter device 27 that includes a plurality of rotatable louvers 26 (open-close door) is arranged at the air passing port 25. The shutter device 27 includes an actuator (not shown) that operates the plurality of louvers 26 and opens and closes the air passing port 25 by an operation by the actuator. The actuator of the shutter device 27 is controlled by the controller 20. A cooling fan 28 for sending air to the external heat exchanger 22 is provided at a rearward position of the external heat exchanger 22.

The liquid reception container 23 is connected to an exit part of the external heat exchanger 22, separates the refrigerant that flows out of the external heat exchanger 22 into a gas and a liquid, and supplies the liquid refrigerant to the expansion valve 24 side. The expansion valve 24 reduces the pressure of the liquid refrigerant that flows in from the external heat exchanger 22 via the liquid reception container 23 and expands the refrigerant. The refrigerant that passes through the expansion valve 24 becomes a wet saturated steam.

The evaporator 11 performs a heat exchange between the refrigerant which passes through the expansion valve 24 and air for air conditioning inside the air conditioner unit 12 and allows the refrigerant which finishes the heat exchange to return to the compressor 21. In the evaporator 11, the refrigerant in a state of the wet saturated steam absorbs heat from the surroundings and changes into a gas. The refrigerant that passes through the evaporator 11 becomes a gas refrigerant and is suctioned by the compressor 21.

A first temperature sensor 31 (refrigerant temperature detection part) for determining the temperature of the refrigerant which flows into the expansion valve 24 is provided in the pipe of the refrigerant circuit 13 between the liquid reception container 23 and the expansion valve 24. The first temperature sensor 31 is arranged inside the pipe at a part close to an inlet of the expansion valve 24. A detection result (detection signal) that is determined by the first temperature sensor 31 is input to the controller 20.

A second temperature sensor 32 (vehicle environment temperature detection part) for determining a temperature (temperature outside the refrigerant circuit 13) under an installation environment of the refrigerant circuit 13 inside the vehicle 1 is provided outside the refrigerant circuit 13. A detection result (detection signal) that is determined by the second temperature sensor 32 is input to the controller 20.

The controller 20 controls the rotation speed of the cooling fan 28 and an open-close state of the louver 26 of the shutter device 27 in a cooling operation time in response to the detection signals of the first temperature sensor 31 and the second temperature sensor 32.

The controller 20 compares a detection temperature (determined refrigerant temperature) by the first temperature sensor 31 to a detection temperature (determined external temperature) by the second temperature sensor 32 in the cooling operation time. The controller 20 obtains a detection temperature difference between the detection temperatures of the first temperature sensor 31 and the second temperature sensor 32. When the detection temperature difference exceeds a first set temperature difference $\alpha T$, the controller 20 allows the air passing port 25 to be in an open state by the louver 26 and, in that state, operates the cooling fan 28 at a preset normal speed. When the detection temperature difference is equal to or less than the first set temperature difference $\alpha T$, the controller 20 reduces the rotation speed of the cooling fan 28 such that the cooling performance with respect to the external heat exchanger 22 is decreased. The rotation speed of the cooling fan 28 is reduced at a rate corresponding to the temperature difference.

In the cooling operation time, when the detection temperature difference between the detection temperatures of the first temperature sensor 31 and the second temperature sensor 32 is equal to or less than a second set temperature difference $\beta T$ that is smaller than the first set temperature difference $\alpha T$, the controller 20 allows the rotation speed of the cooling fan 28 to be a minimum rotation speed and allows the air passing port 25 to be in a closed state by the louver 26. When the detection temperature difference between the detection temperatures of the first temperature sensor 31 and the second temperature sensor 32 exceeds the second set temperature difference $\beta T$, the louver 26 is allowed to be in an open state. When the detection temperature difference between the detection temperatures of the first temperature sensor 31 and the second temperature sensor 32 becomes equal to or less than the second set temperature difference $\beta T$, the louver 26 is allowed to be in a closed state.

In the air conditioner 10 of the first embodiment, in the cooling operation time, when the vehicle environment temperature is decreased due to a decrease of an external air temperature, an increase of a vehicle travel speed, and the like, the flow rate of the refrigerant that is circulated in the refrigerant circuit 13 being decreased by excessive cooling of the refrigerant inside the external heat exchanger 22 and thereby the discharge pressure of the compressor 21 being decreased are prevented.

Figure 3:
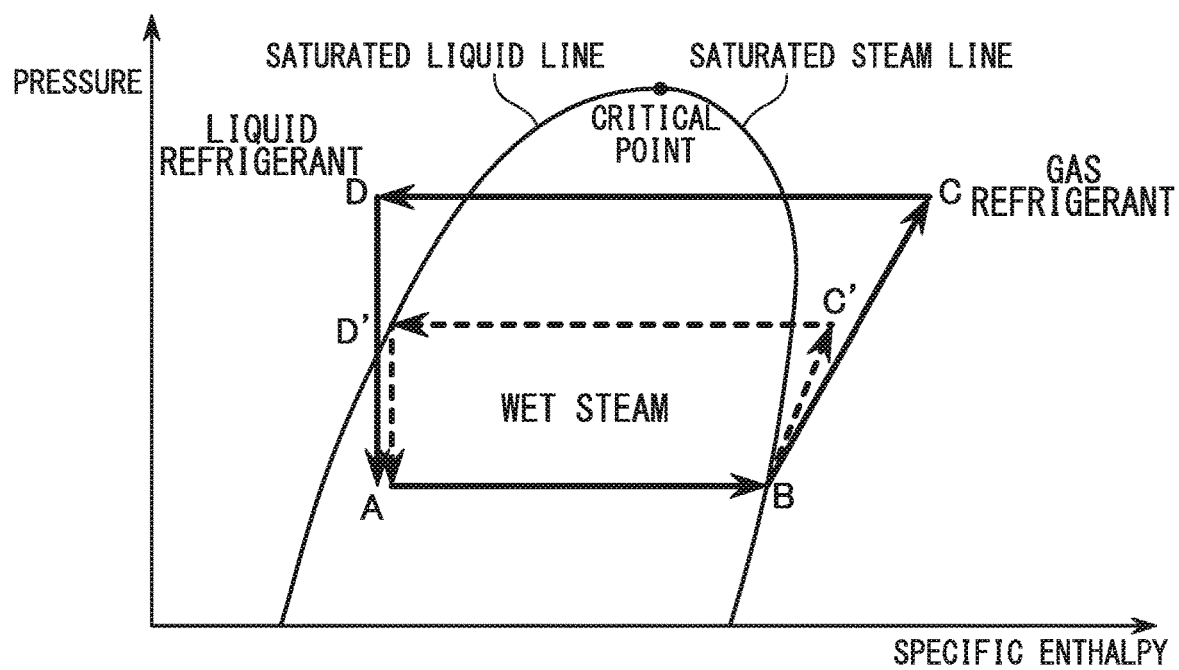
FIG. 3 is a pressure-specific enthalpy line view describing a characteristic of a refrigerant circuit of the vehicle air conditioner according to the first embodiment of the present invention.

FIG. 3 is a pressure-specific enthalpy line view of the air conditioner 10 of the first embodiment.

In FIG. 3, "A" represents a state of the refrigerant after passing through the expansion valve 24 and when flowing into the evaporator 11. "B" represents a state of the refrigerant after passing through the evaporator 11 and when being suctioned by the compressor 21. "C" represents a state of the refrigerant after being compressed by the compressor 21 and when flowing into the external heat exchanger 22. "D" represents a state of the refrigerant after passing through the external heat exchanger 22 and when flowing into the expansion valve 24. In a span from A to B of FIG. 3, the wet saturated steam of a low-temperature and low-pressure refrigerant that flows into the evaporator 11 absorbs heat from the air for air conditioning and thereby gradually changes into a gas refrigerant. In a span from B to C of FIG. 3, the gas refrigerant is compressed by the compressor 21 and thereby becomes a high-temperature and high-pressure gas refrigerant. In a span from C to D of FIG. 3, the high-temperature and high-pressure gas refrigerant releases heat at the external heat exchanger 22, changes into a high pressure wet saturated steam, and then changes into a high-pressure liquid refrigerant. In a span from D to A of FIG. 3, the liquid refrigerant passes through the expansion valve 24 and thereby changes into a low-temperature and low-pressure wet saturated steam.

In the cooling operation time, in an ordinary situation in which the refrigerant that passes through the external heat exchanger 22 does not become an excessive cooling state, the pressure of the refrigerant inside the external heat exchanger 22 is maintained to be sufficiently high as shown by C-D of FIG. 3. Therefore, in the state of D of FIG. 3 after passing through the external heat exchanger 22, the refrigerant becomes a state of a liquid refrigerant, and little wet steam is mixed in the refrigerant. Accordingly, when the refrigerant that exits from the external heat exchanger 22 passes through the expansion valve 24, an abnormal sound does not occur at the expansion valve 24.

On the other hand, in the cooling operation time, when the refrigerant that passes through the external heat exchanger 22 becomes an excessive cooling state due to a decrease of an external air temperature and the like, the flow rate of the refrigerant that passes inside refrigerant circuit 13 is decreased, and the discharge pressure of the compressor 21 becomes a pressure of C' that is lower than a pressure of C of FIG. 3. Then, the pressure inside the external heat exchanger 22 indicated by C'-D' in FIG. 3 also becomes the pressure of C' that is lower than the pressure of C in the ordinary time. Therefore, in the state of D' of FIG. 3 after passing through the external heat exchanger 22, a refrigerant in a state of the wet steam is mixed in the refrigerant. In the air conditioner 10 of the first embodiment, the discharge pressure (pressure inside the external heat exchanger 22) of the compressor 21 is maintained to be the sufficiently high pressure of C by the control by the controller 20 described above.

Figure 4:
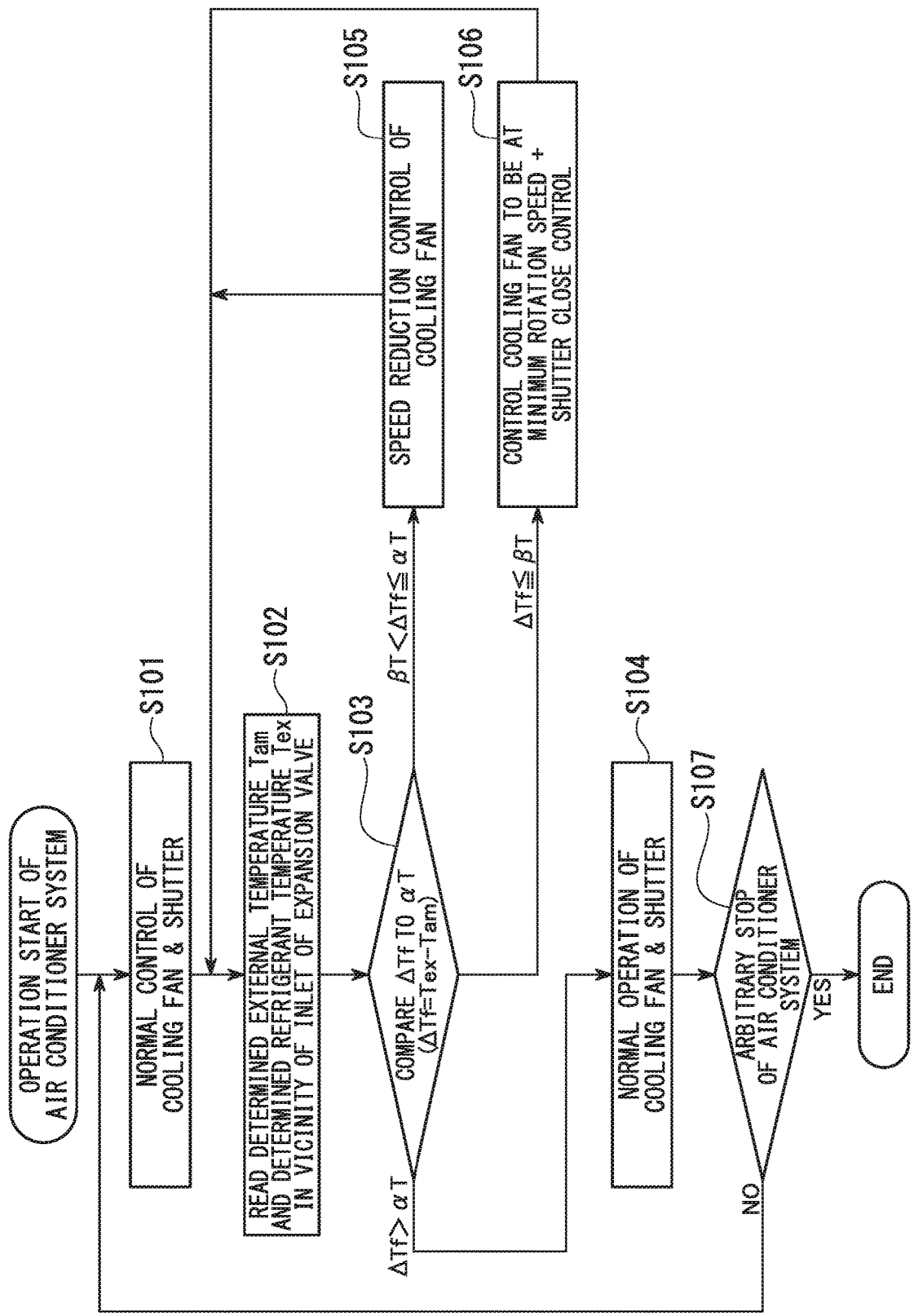
FIG. 4 is a flowchart showing a flow of a control of the vehicle air conditioner according to the first embodiment of the present invention.

Next, with reference to a flowchart of FIG. 4, an example of a control of the air conditioner 10 of the first embodiment is described.

When the air conditioner 10 is started, in Step S101, the controller 20 is configured to control the cooling fan 28 and the shutter device 27 in a normal state. That is, in Step S101, the cooling fan 28 is operated at a preset normal speed, and the louver 26 of the shutter device 27 is allowed to be in an open state (the air passing port 25 is opened).

In Step S102, the controller 20 reads a determined external temperature Tam that is determined by the second temperature sensor 32 and a determined refrigerant temperature Tex that is determined by the first temperature sensor 31.

In the following Step S103, the controller 20 obtains a temperature difference $\Delta Tf$ between the determined refrigerant temperature Tex and the determined external temperature Tam and determines in which of temperature difference regions is the temperature difference $\Delta Tf$.

When the temperature difference $\Delta Tf$ is more than the first set temperature difference $\alpha T$, the routine proceeds to Step S104. When the temperature difference $\Delta Tf$ is equal to or less than the first set temperature difference $\alpha T$ and is more than the second set temperature difference $\beta T$, the routine proceeds to Step S105. In Step S103, when the temperature difference $\Delta Tf$ is equal to or less than the second set temperature difference $\beta T$, the routine proceeds to Step S106.

When the routine proceeds to Step S104, the controller 20 is configured to control the cooling fan 28 and the shutter device 27 in a normal state. In the following Step S107, it is determined whether or not a stop command is input to the air conditioner 10. At this time, the process is finished when the stop command is input. The routine returns to Step S101 when the stop command is not input.

When the routine proceeds from Step S103 to Step S105, the controller 20 performs a speed reduction control of the cooling fan 28. The speed reduction control of the cooling fan 28 by the controller 20, for example, reduces the speed of the cooling fan 28 in response to a range of the temperature difference $\Delta Tf$.

When the routine proceeds from Step S103 to Step S106, the controller 20 controls the cooling fan 28 to a preset minimum rotation speed (MIN) and switches the louver 26 of the shutter device 27 to be in a closed state.

In the flowchart of FIG. 4, when the temperature difference $\Delta Tf$ is equal to or less than the second set temperature difference $\beta T$, the cooling fan 28 is controlled to be at a preset minimum rotation speed (MIN), and the louver 26 of the shutter device 27 is switched to be in a closed state (Step S106); however, only in a case where the temperature difference $\Delta Tf$ is not increased to be more than a set value after the speed reduction control of the cooling fan 28 is performed first, the louver 26 of the shutter device 27 may be switched to be in a closed state.

FIG. 5 is a view showing an example of a relationship among a range of the temperature difference $\Delta Tf$, a rotation speed of the cooling fan 28 corresponding to the range, and an open-close state of the louver 26 of the shutter device 27. In a case of an example shown in FIG. 5, a temperature difference 10 deg is the first set temperature difference $\alpha T$, and a temperature difference 3 deg is the second set temperature difference $\beta T$. When the determined temperature difference $\Delta Tf$ exceeds 10 deg (first set temperature difference $\alpha T$), the cooling fan 28 is controlled to be at a speed (MAX) of a normal state. When the determined temperature difference $\Delta Tf$ is equal to or less than 10 deg, the cooling fan 28 is controlled to each of speeds of 70%, 50%, 30% of the speed (MAX) of the normal state in response to the classification such that the rotation speed of the cooling fan 28 is gradually decreased as the determined temperature difference $\Delta Tf$ is decreased. In this range, the louver 26 of the shutter device 27 is maintained to be in an open state by a control by the controller 20.

As described above, in the air conditioner 10 of the first embodiment, in the cooling operation time, when the refrigerant at the exit part of the external heat exchanger 22 becomes an excessive cooling state due to a decrease of an external air temperature, an increase of a vehicle travel speed, and the like, the controller 20 controls the speed of the cooling fan 28 such that the cooling performance of the cooling fan 28 with respect to the external heat exchanger 22 is decreased. In the first embodiment, the controller 20 monitors the temperature difference $\Delta Tf$ between the determined refrigerant temperature by the first temperature sensor 31 and the determined external temperature by the second temperature sensor 32, and the controller 20 reduces the rotation speed of the cooling fan 28 when the temperature difference $\Delta Tf$ is equal to or less than the first set temperature difference $\alpha T$. Accordingly, when the air conditioner 10 of the first embodiment is employed, it is possible to prevent the wet saturated steam from being mixed in the liquid refrigerant that flows to the expansion valve 24 side from the external heat exchanger 22, and it is possible to prevent an abnormal sound when the refrigerant passes through the expansion valve 24 from occurring.

Further, the air conditioner 10 of the first embodiment includes the shutter device 27 having the louver 26 and controls the shutter device 27 (open-close of the louver 26) in a cooling operation time such that the air passing port 25 is opened when the determined temperature difference $\Delta Tf$ exceeds the second set temperature difference $\beta T$ which is smaller than the first set temperature difference $\alpha T$ and such that the air passing port 25 is closed when the determined temperature difference $\Delta Tf$ is equal to or less than the second set temperature difference $\beta T$. Accordingly, when the air conditioner 10 of the first embodiment is employed, even when the vehicle is traveling at a high speed under a situation in which an external air temperature is low, it is possible to prevent excessive cooling of the refrigerant by the external heat exchanger 22, and it is possible to prevent an abnormal sound when the refrigerant passes through the expansion valve 24 from occurring.

Figure 6:
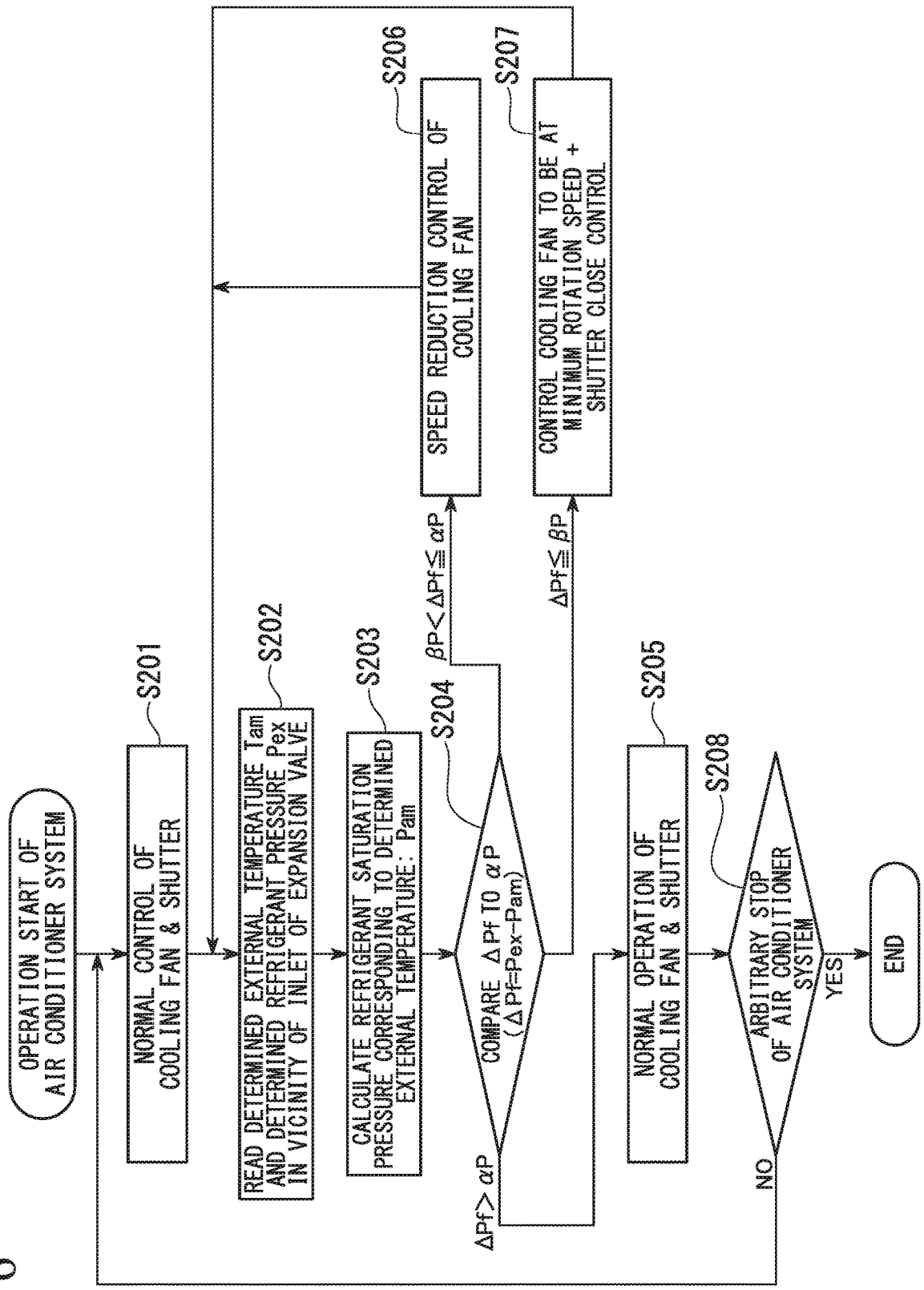
FIG. 6 is a flowchart showing a flow of a control of a vehicle air conditioner according to a second embodiment of the present invention.

Next, a second embodiment shown in FIG. 6 and FIG. 7 is described. The entire configuration of the air conditioner is described with reference to FIG. 2.

The basic configuration of the air conditioner of the second embodiment is almost similar to that of the air conditioner of the first embodiment, but the air conditioner of the second embodiment is greatly different in that a pressure sensor 35 (refrigerant pressure detection part) in place of the first temperature sensor 31 (refrigerant temperature detection part) is provided inside the pipe of the refrigerant circuit 13 at a part close to an inlet of the expansion valve 24. The pressure sensor 35 determines the pressure of the refrigerant that flows in the expansion valve 24 in the refrigerant circuit 13.

The controller 20 of the second embodiment controls the rotation speed of the cooling fan 28 and an open-close state of the louver 26 of the shutter device 27 in a cooling operation time in response to the detection signals of the pressure sensor 35 and the second temperature sensor 32.

The controller 20 compares a detection pressure (determined refrigerant pressure) by the pressure sensor 35 to a refrigerant saturation pressure corresponding to a detection temperature (determined external temperature) by the second temperature sensor 32 in the cooling operation time. The controller 20 obtains a pressure difference $\Delta Pf$ between the detection pressure by the pressure sensor 35 and the refrigerant saturation pressure corresponding to the detection temperature by the second temperature sensor 32. When the pressure difference $\Delta Pf$ exceeds a first set pressure difference $\alpha P$, the controller 20 allows the air passing port 25 to be in an open state by the louver 26 and, in that state, operates the cooling fan 28 at a preset normal speed. When the pressure difference $\Delta Pf$ is equal to or less than the first set pressure difference $\alpha P$, the controller 20 reduces the rotation speed of the cooling fan 28 such that the cooling performance of the cooling fan 28 with respect to the external heat exchanger 22 is decreased. The rotation speed of the cooling fan 28 is reduced at a rate corresponding to the pressure difference $\Delta Pf$.

The controller 20 obtains a pressure difference ΔPf between the determined refrigerant pressure that is determined by the pressure sensor 35 and the refrigerant saturation pressure corresponding to the determined external temperature that is determined by the second temperature sensor 32 in the cooling operation time. Then, when the obtained pressure difference ΔPf is equal to or less than a second set pressure difference βP that is smaller than the first set pressure difference αP, the controller 20 allows the rotation speed of the cooling fan 28 to be a minimum rotation speed (MIN) and allows the air passing port 25 to be in a closed state by the louver 26. When the obtained pressure difference ΔPf exceeds the second set pressure difference βP, the louver 26 is allowed to be in an open state. When the obtained pressure difference ΔPf becomes equal to or less than the second set pressure difference βP, the louver 26 is allowed to be in a closed state.

With reference to a flowchart of FIG. 6, an example of a control of an air conditioner of the second embodiment is described.

When the air conditioner is started, in Step S201, the controller 20 controls the cooling fan 28 and the shutter device 27 in a normal state. In Step S201, the cooling fan 28 is operated at a preset normal speed, and the louver 26 of the shutter device 27 is allowed to be in an open state (the air passing port 25 is opened).

In Step S202, the controller 20 reads a determined external temperature Tam that is determined by the second temperature sensor 32 and a determined refrigerant pressure Pex that is determined by the pressure sensor 35.

In Step S203, a refrigerant saturation pressure Pam corresponding to the detection temperature (determined external temperature) by the second temperature sensor 32 is calculated.

In the following Step S204, the controller 20 obtains a pressure difference ΔPf between the determined refrigerant pressure Pex and the obtained saturation pressure Pam and determines in which of pressure difference regions is the pressure difference ΔPf.

When the pressure difference ΔPf is more than the first set pressure difference αP, the routine proceeds to Step S205. When the pressure difference ΔPf is equal to or less than the first set pressure difference αP and is more than the second set pressure difference βP, the routine proceeds to Step S206. In Step S204, when the pressure difference ΔPf is equal to or less than the second set pressure difference βP, the routine proceeds to Step S207. When the routine proceeds to Step S205, the controller 20 controls the cooling fan 28 and the shutter device 27 in a normal state.

In the following Step S208, it is determined whether or not a stop command is input to the air conditioner 10.

At this time, the process is finished when the stop command is input. The routine returns to Step S201 when the stop command is not input.

When the routine proceeds from Step S204 to Step S205, the controller 20 performs a speed reduction control of the cooling fan 28. The speed reduction control of the cooling fan 28 by the controller 20, for example, reduces the speed of the cooling fan 28 in response to a range of the pressure difference ΔPf.

When the routine proceeds from Step S204 to Step S208, the cooling fan 28 is controlled to be at a preset minimum rotation speed (MIN), and the louver 26 of the shutter device 27 is switched to be in a closed state.

In the flowchart of FIG. 6, when the pressure difference ΔPf is equal to or less than the second set pressure difference βP, the cooling fan 28 is controlled to be at a preset minimum rotation speed (MIN), and the louver 26 of the shutter device 27 is switched to be in a closed state (Step S207); however, only in a case where the pressure difference ΔPf is not increased to be more than a set value after the speed reduction control of the cooling fan 28 is performed first, the louver 26 of the shutter device 27 may be switched to be in a closed state.

FIG. 7 is a view showing an example of a relationship among a range of the pressure difference ΔPf, a rotation speed of the cooling fan 28 corresponding to the range, and an open-close state of the louver 26 of the shutter device 27. In a case of an example of FIG. 7, a pressure difference 1.0 Mpa is the first set pressure difference αP, and a pressure difference 0.3 Mpa is the second set pressure difference βP. When the pressure difference ΔPf exceeds 1.0 Mpa (first set pressure difference αP), the cooling fan 28 is controlled to be at a speed (MAX) of a normal state. When the pressure difference ΔPf is equal to or less than 1.0 Mpa, the cooling fan 28 is controlled to each of speeds of 70%, 50%, 30% of the speed (MAX) of the normal state in response to the classification such that the rotation speed of the cooling fan 28 is gradually decreased as the pressure difference ΔPf is decreased. In this range, the louver 26 of the shutter device 27 is maintained to be in an open state by a control by the controller 20.

As described above, also in the case of the air conditioner of the second embodiment, in the cooling operation time, when the refrigerant at the exit part of the external heat exchanger 22 becomes an excessive cooling state due to a decrease of an external air temperature, an increase of a vehicle travel speed, and the like, the controller 20 controls the speed of the cooling fan 28 such that the cooling performance of the cooling fan 28 with respect to the external heat exchanger 22 is decreased. Specifically, in the second embodiment, the determined refrigerant pressure Pex by the pressure sensor 35 and the refrigerant saturation pressure Pam corresponding to the determined external temperature Tam by the second temperature sensor 32 are monitored, and the controller 20 reduces the rotation speed of the cooling fan 28 when the pressure difference ΔPf between the determined refrigerant pressure Pex and the saturation pressure Pam is equal to or less than the first set pressure difference αP.

Accordingly, also when the air conditioner 10 of the second embodiment is employed, it is possible to prevent the wet saturated steam from being mixed in the liquid refrigerant that flows to the expansion valve 24 side from the external heat exchanger 22, and it is possible to prevent an abnormal sound when the refrigerant passes through the expansion valve 24 from occurring.

Further, the air conditioner of the second embodiment includes the shutter device 27 having the louver 26 and controls the shutter device 27 in a cooling operation time such that the louver 26 of the shutter device 27 opens the air passing port 25 when the pressure difference ΔPf exceeds the second set pressure difference βP which is smaller than the first set pressure difference αP and such that the air passing port 25 is closed when the pressure difference ΔPf is equal to or less than the second set pressure difference βP. Therefore, when the air conditioner of the second embodiment is employed, even when the vehicle is traveling at a high speed under a situation in which an external air temperature is low, it is possible to prevent excessive cooling of the refrigerant by the external heat exchanger 22, and it is possible to prevent an abnormal sound when the refrigerant passes through the expansion valve 24 from occurring.

The invention is not limited to the embodiments described above, and a variety of design changes can be made without departing from the scope of the invention.

What is claimed is:

1. A vehicle air conditioner comprising:
   a refrigerant circuit which includes
   a compressor that is configured to compress and discharge a refrigerant,
   an external heat exchanger that is configured to perform a heat exchange between external air and the refrigerant which is discharged from the compressor,
   an expansion valve that is configured to reduce a pressure of the refrigerant applied with the heat exchange at the external heat exchanger, and
   an evaporator that is configured to perform a heat exchange between the refrigerant which passes through the expansion valve and air for air conditioning and that is configured to allow the refrigerant which finishes the heat exchange to return to the compressor; and
   a cooling fan that is configured to send air to the external heat exchanger,
   wherein the refrigerant is circulated through the compressor, the external heat exchanger, the expansion valve, and the evaporator in this order in a cooling operation time, the vehicle air conditioner further comprising:
   a refrigerant temperature detector that is configured to detect a temperature of the refrigerant which flows into the expansion valve;
   a vehicle environment temperature detector that is provided outside the refrigerant circuit and that is configured to detect an ambient temperature outside the refrigerant circuit; and
   a controller that is configured to control parts including the cooling fan,
   wherein the controller is configured to reduce a speed of the cooling fan in a cooling operation time when a temperature difference between a detected refrigerant temperature by the refrigerant temperature detector and a detected ambient temperature outside the refrigerant circuit by the vehicle environment temperature detector is equal to or less than a first set temperature difference.

2. The vehicle air conditioner according to claim 1, further comprising
   an open-close door that is configured to open and close a passage of an external air which flows to the external heat exchanger,
   wherein the controller is configured to control the open-close door in a cooling operation time such that the passage is opened when the temperature difference between the detected refrigerant temperature by the refrigerant temperature detector and the detected ambient temperature outside the refrigerate circuit by the vehicle environment temperature detector exceeds a second set temperature difference which is a value that is smaller than the first set temperature difference and such that the passage is closed when the temperature difference between the detected refrigerant temperature by the refrigerant temperature detector and the detected ambient temperature outside the refrigerant circuit by the vehicle environment temperature detector is equal to or less than the second set temperature difference.

* * * * *